United States Patent [19]

Buda et al.

[11] Patent Number: 5,287,353
[45] Date of Patent: Feb. 15, 1994

[54] APPARATUS FOR GENERATING AND SENDING A SERIAL DATA PACKET FOR CONTROLLING A NETWORK OF SINGLE POINT I/O DEVICES

[75] Inventors: Paul R. Buda, Raleigh; Kelvin Peele, Cary, both of N.C.

[73] Assignee: Square D Company, Palatine, Ill.

[21] Appl. No.: 812,149

[22] Filed: Dec. 23, 1991

[51] Int. Cl.⁵ ............................................. H04J 3/02
[52] U.S. Cl. .............................. 370/85.1; 340/825.06; 375/3
[58] Field of Search ................. 370/85.1, 85.4, 85.5, 370/97, 99, 105.1, 105.5, 85.15, 85.6, 85.7, 85.4, 85.12, 94.1; 340/825.05, 825.06, 825.07; 375/116, 114, 3, 7, 8; 395/275

[56] References Cited

U.S. PATENT DOCUMENTS

| | | | |
|---|---|---|---|
| 4,794,592 | 12/1988 | Caine et al. | 370/97 |
| 4,868,812 | 9/1989 | Kruger et al. | 370/85.1 |
| 4,988,989 | 1/1991 | Goto | 370/85.1 |
| 5,105,421 | 4/1992 | Gingell | 370/85.1 |
| 5,117,421 | 5/1992 | Tokizane et al. | 370/85.1 |
| 5,163,048 | 11/1992 | Heatink | 370/85.1 |

*Primary Examiner*—Douglas W. Olms
*Assistant Examiner*—Dang Ton
*Attorney, Agent, or Firm*—Michael J. Femal; Richard J. Graefe; Larry I. Golden

[57] ABSTRACT

A communication system between a microprocessor based device and a network of a plurality of remote input/output repeater modules that control various input and output devices uses a synchronous serial communications protocol. The microprocessor based device contains a transmitter module for generating a data packet that is sent to the remote input/output repeater modules. The transmitter module controls the clock rate of the network and encodes the data packet with an output data byte for each of the repeater modules. The output byte determines the state of the output devices that may be connected to the remote input/output repeater module coupled to the network.

9 Claims, 7 Drawing Sheets

APPARATUS FOR GENERATING AND SENDING A SERIAL DATA PACKET FOR CONTROLLING A NETWORK OF SINGLE POINT I/O DEVICES

DESCRIPTION

1. Technical Field

Applicants' invention relates generally to electrical control mechanisms and more particularly to a network of single point input and output devices serially connected to programmable logic controllers or other types of microprocessor based devices that perform a number of control functions.

2. Related Application

This application is related to the following, commonly assigned applications filed concurrently herewith, entitled "A Synchronous Serial Communication Network For Controlling Single Point I/O Devices" Ser. No. 812,388; "Apparatus For Receiving And Decoding A Serial Data Packet Containing The Status Of A Network of Single Point I/O Devices" Ser. No. 811,722, and "Apparatus for Receiving And Modifying A Serial Data Packet From A Communications Network To Indicate Its Status" Ser. No. 811,727. The contents of these applications are expressly incorporated herein by reference.

BACKGROUND ART

Input and output control modules for interfacing with a programmable logic controller (PLC) that is normally used to control a number of functions in a manufacturing operation are well known. In most instances, these control module assemblies are electrically interconnected in a rack assembly with the PLC. This assembly is often of necessity located on the plant floor at a distance from the machinery used in the manufacturing operation to prevent physical abuse from dirt, moisture, or vibration. Since many of the switches, pilot lights, control relays and so on are located on the machinery, considerable wiring is required to connect these devices to the PLC since each device requires at least two wires between it and its respective I/O point.

Remote I/O control modules are available that can be located in a rack assembly mounted directly on the machinery. Whereas this will reduce the wiring requirements, the additional rack assembly will require adding a power supply and a remote network interface module (NIM) that could be more costly. These assemblies are generally bulky and require mounting space that may not be available. Each device will still require a direct connection to the remote I/O control module.

The host PLC will also require a local NIM Communications between the local and remote NIMs can become complicated. Each device has an unique address. There must be a means for each I/O point to know and set its address location so that it can decode and select the data meant for it from the various data packets sent over the communication link by the PLC. It must also be able to mark its data with its identity when it is being sent back to the PLC. With very large systems, response times can become a problem because of the additional overhead required just for address decoding. Error detection and correction also becomes more complex as the number of data packets becomes greater. Typically these packets generally include a preamble portion containing the routing information, the data, and an error detection portion such as a checksum.

It is also well known that the I/O control modules require frequent replacement when a malfunction occurs. Since a malfunction of necessity shuts down the machine operation, replacement must be made in a minimum amount of time. Many I/O control modules have 16 or more I/O points. Replacing the module would mean removing and reconnecting at least 32 wires. Adding or deleting control modules for system changes requires reconfiguration of the individual points for addressing purposes.

The present invention is provided to solve these and other problems.

SUMMARY OF THE INVENTION

It is an object of the invention to provide a low cost communication system between a programmable logic controller and a network of a plurality of remote input/output repeater modules using a synchronous serial communications protocol.

It is a further object of the invention to provide a communication system wherein the programmable logic controller contains a transmitter module for generating a data packet determining the state of the output device connected to the remote input/output repeater modules coupled to the network.

It is a still further object of the invention to provide a communication system wherein the programmable logic controller contains a receiver module for receiving and decoding a data packet indicative of the state of the input devices connected to the remote input/output repeater modules coupled to the network.

It is a yet another object of the invention to provide a communication system wherein a first remote input/output repeater module coupled to the network receives and decodes the data packet to determine the state of its output device and modifies the data packet to indicate the state of its input device. The modified data packet is sent to the next in line remote input/output repeater module coupled to the network.

Finally, it is an object of the invention to provide a communication system wherein the synchronous serial communications protocol uses a Manchester split-phase binary code for the data bytes.

Other features and advantages of the invention will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
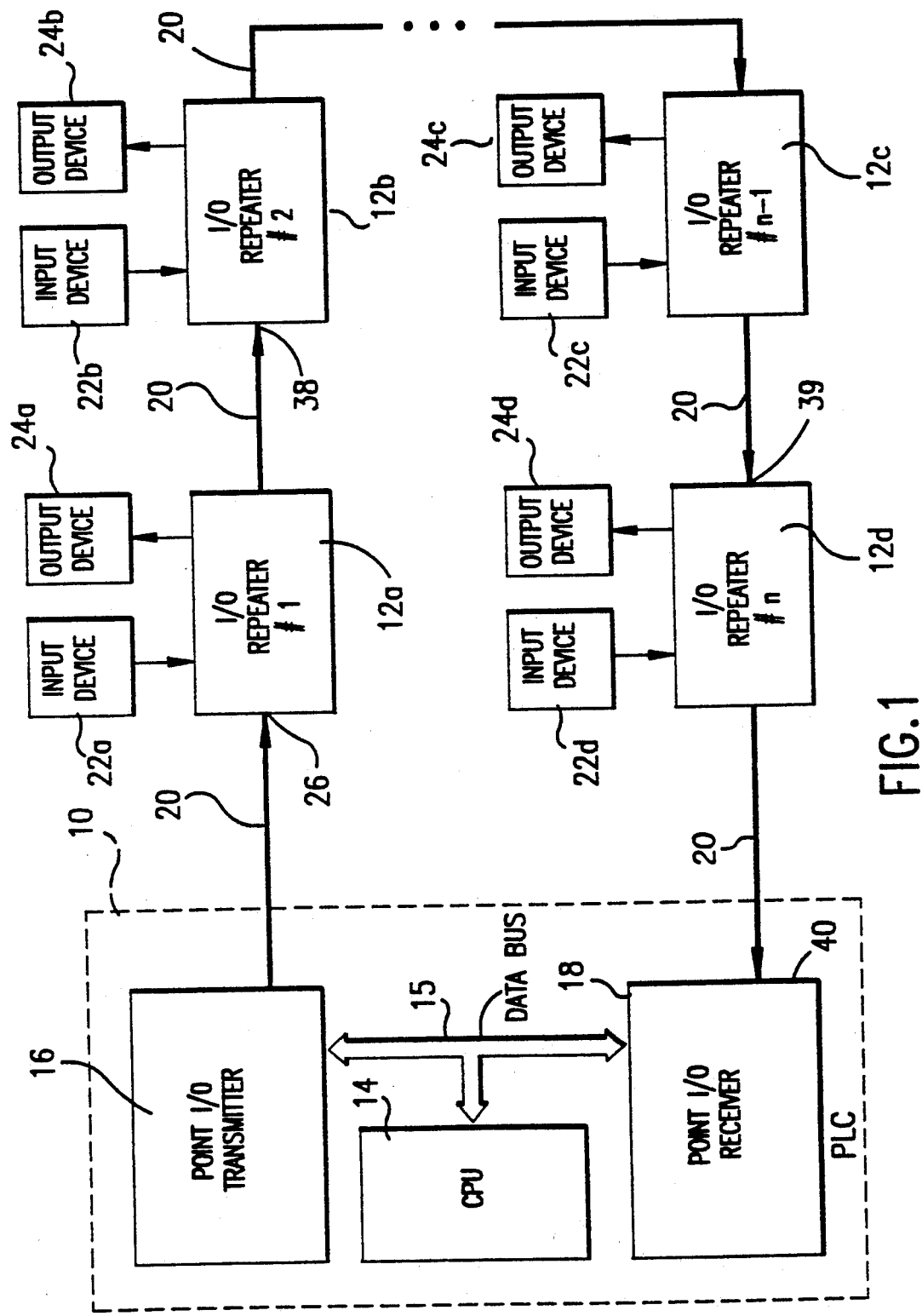
FIG. 1 is a block diagram of a communication system according to the present invention.

Referring to FIG. 1 of the drawings, a low cost communication system between a programmable logic controller (PLC)10 and a network of remote input/output repeater (IOR) modules 12 using a synchronous communications protocol is disclosed. The PLC 10 contains a CPU 14 for executing a ladder program for controlling a number of functions in a manufacturing operation. A data bus 15 connects the CPU 14 with a point I/O transmitter 16 and a point I/O receiver 18. A serial loop communications network 20 starts with the transmitter 16, interconnects with each IOR 12, and terminates with the receiver 18. The transmission medium for the network 20 may be wire or fiber optical. Input devices 22 and output devices 24 for the manufacturing operation which respond and interact with the ladder program are connected to the IORs 12. Each remote IOR 12 has the capability of providing for an input, an output, or both. The network 20 is multiconductor and requires two signal lines, including a serial data line 20a and a clock line 20b. Additional wires provide power distribution and ground referencing. The number of remote IORs 12 on the network 20 is only limited by the transmission medium and system parameters such as clock frequency, cycle times, etc. The address of each remote IOR 12 is not unique as it is automatically determined by its position in the loop between the transmitter 16 and the receiver 18. A serial data packet 21 of information transmitted over the serial data line 20a consists of an input sync 30, an output sync 31, and data 32-37. The packet length is dependent on the number of remote IORs 12 connected to the network 20. The input sync 30 and output sync 31 consists of bit patterns that the IORs decode to determine when they should extract or add data to the packet representative of the status of the input and output devices connected to them. The clock line 20b synchronizes the transmitter 16, the IORs 12 and the receiver 18.

Figure 2A:
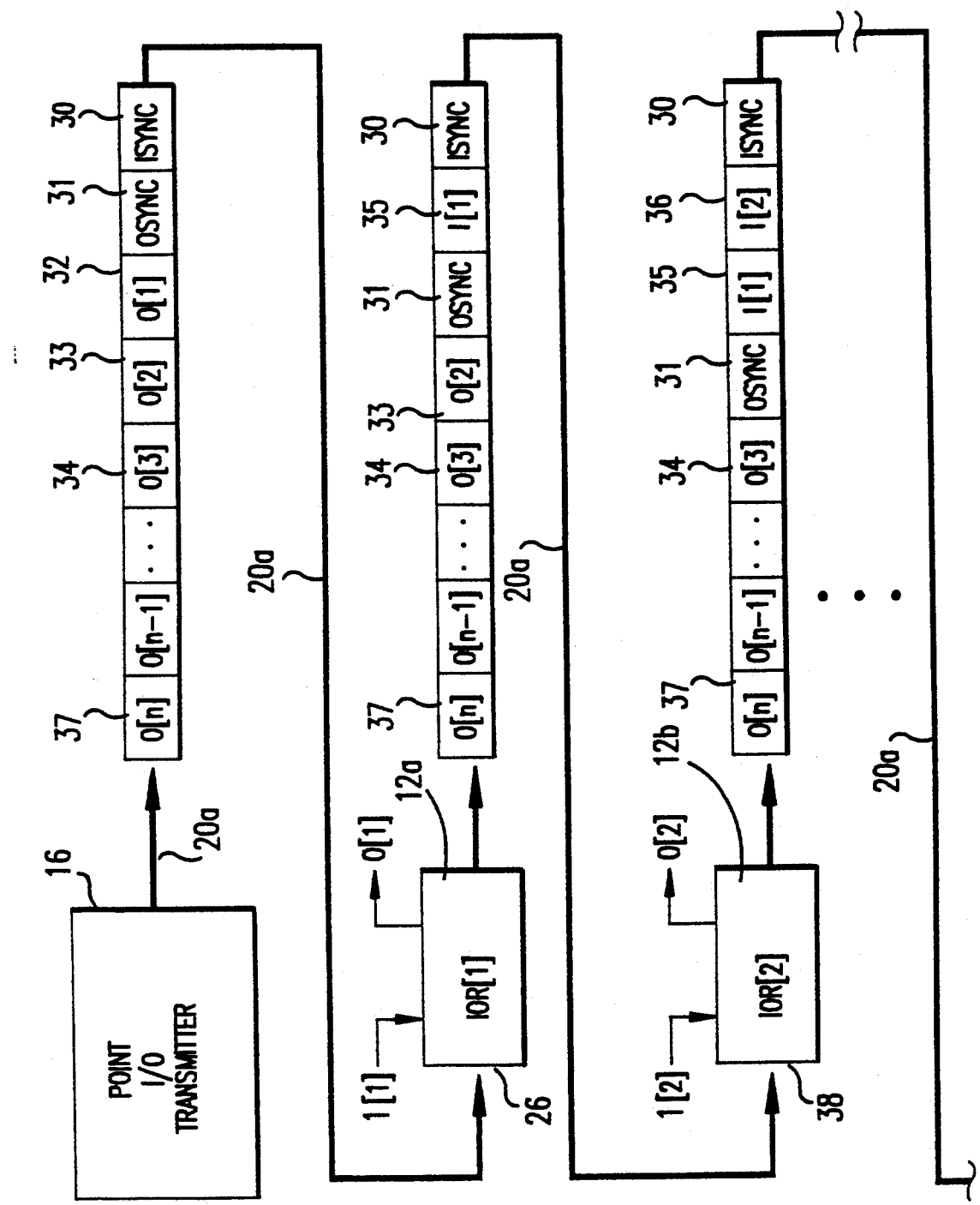
FIGS. 2(a)–(b) are the data format of the data stream as it progresses through the separate input/output repeater modules coupled to the network.
Figure 2B:
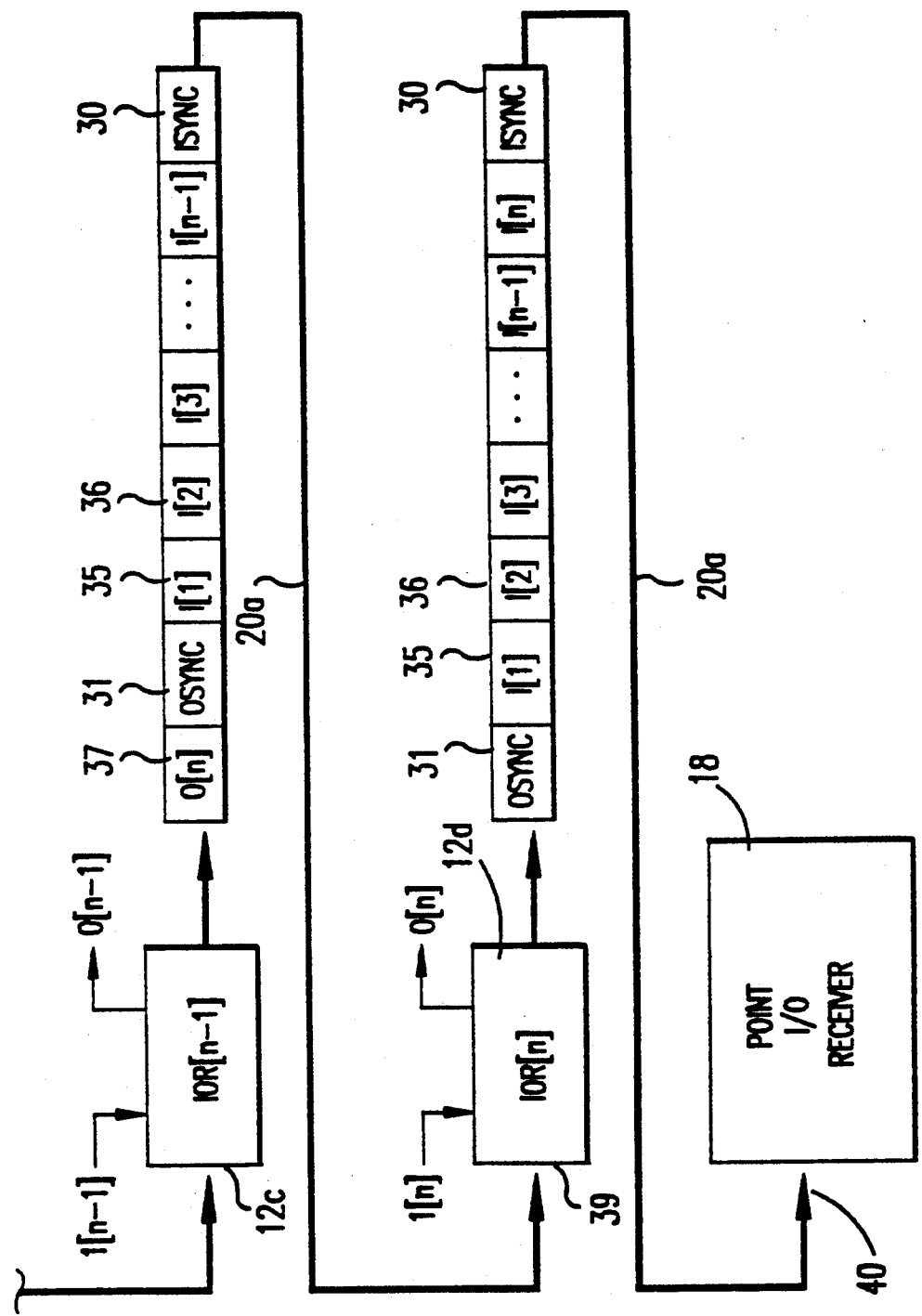

As the ladder program is executing in the PLC, various output devices 24 require either energization or deenergization. The CPU will generate data bytes for each of the output devices 24. These data bytes are coupled to the point I/O transmitter 16 by the data bus 15. The point I/O transmitter 16 generates the serial data line 20a which contains the output data bytes and clock line 20b. The serial data line 20a, as shown in FIGS. 2(a)-2(b) as it leaves the transmitter 16, and as it enters the first IOR 12a at point 26, is in the form of the input byte 30, output byte 31, and n bytes of output data O(n) in ascending order, where n is the total number of IORs 12 connected on the network and n=1 is the first device on the network 20 closest to the transmitter 16. When the serial data packet passes through IOR 12a, the data stream is modified. After IOR 12a decodes the input byte 30, it inserts its input data byte I(1) 35 which represents the state of the input device 22a. IOR 12a will then pass the next data bytes until it decodes the output byte 31. The next byte of data O(1) 32 represents the required state of output device 24a. IOR 12a will extract this byte from the data stream and will then energize or deenergize the output device 24a connected to it. The remaining data stream will then be passed on through IOR 12a to IOR 12b at point 38. This data stream will be the same length as the data stream at point 26 since the byte length of the added input data byte I(1) 35 is the same as the extracted output byte O(1) 32. The second IOR 12b will continue this process. It will add its input device 22b status data I(2) 36 to the data stream after decoding the input byte 30 and extract its output device 24b status data O(2) 33 after decoding the output byte 31. This procedure continues through all the remaining remote IORs 12, 1 through n, resulting in the final modified data stream having the input byte 30, the input data bytes I(1) through I(n) in descending order, and the output byte 31 present at input 40 of receiver 18. All output data bytes O(n) have been extracted. The receiver 18 will decode the received data stream into data bits representative of the state of each input device 22 connected to the IORs 12 and couple these data bits onto the data bus 15 for use by the CPU 14.

Figure 3:
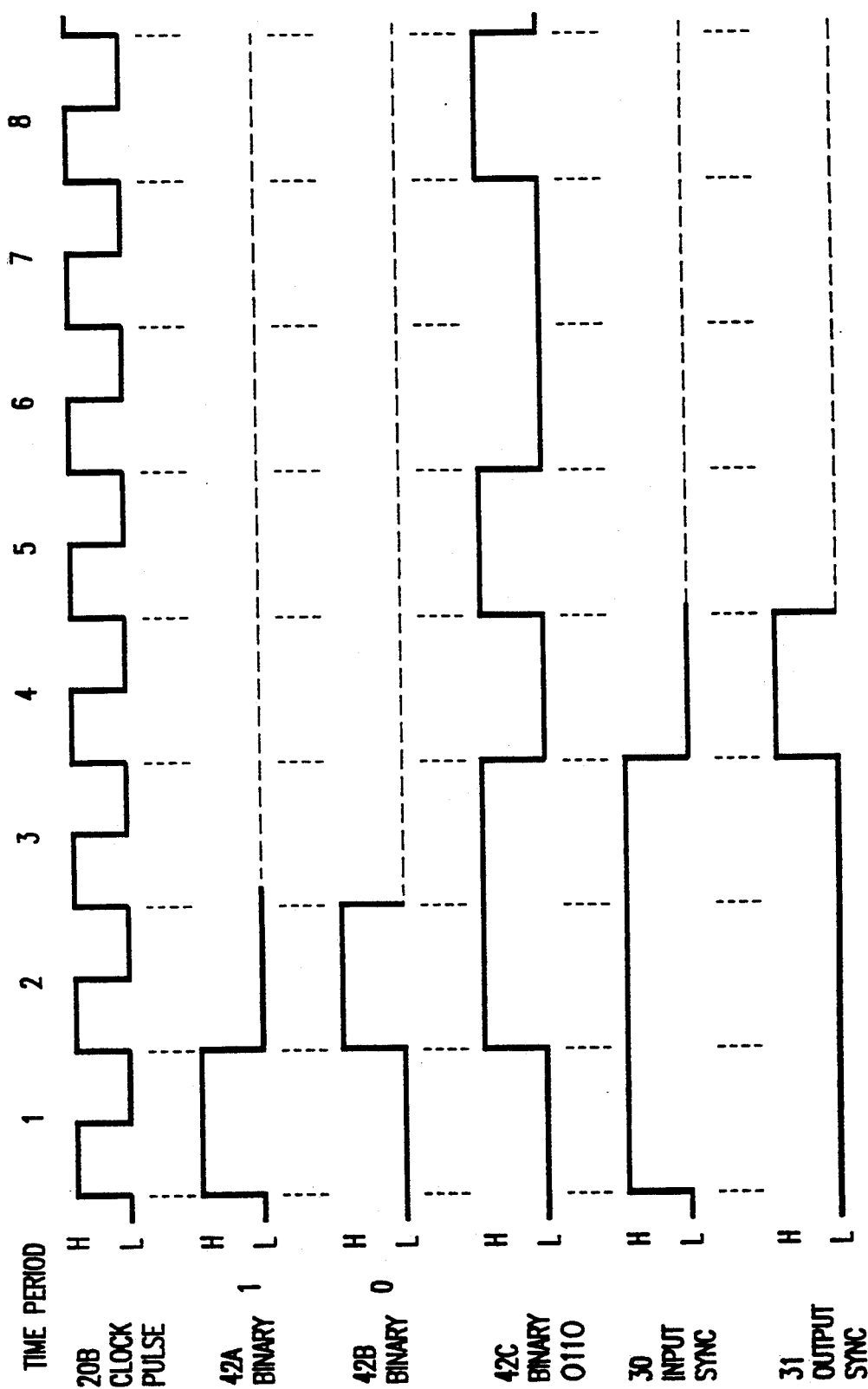
FIG. 3 shows various waveforms representative of different binary representations of data bytes.

The serial data packet 21 is digital so that it has only two states, logic 1 or logic 0, to maintain the simplicity of the system. The free running clock line is shown by FIG. 3 which also illustrates the various combinations of the serial data packet. A split-phase binary representation is used for representation of the data bytes. Two clock cycles are required to represent one binary bit of information. A logic 1 becomes a logic high followed by a logic low as shown by 42a. A logic 0 is a logic low followed by a logic high as shown by 42b. 42c shows the representation for the binary 0110. Because all valid data bits are always logic high-low or logic low-high combinations, the most consecutive logic highs or logic lows that can occur in sequence is two. Therefore the input sync 30 and the output sync 31 can be represented by three or more consecutive logic highs or logic lows without mistaking them for valid input or output data bytes.

Figure 4:
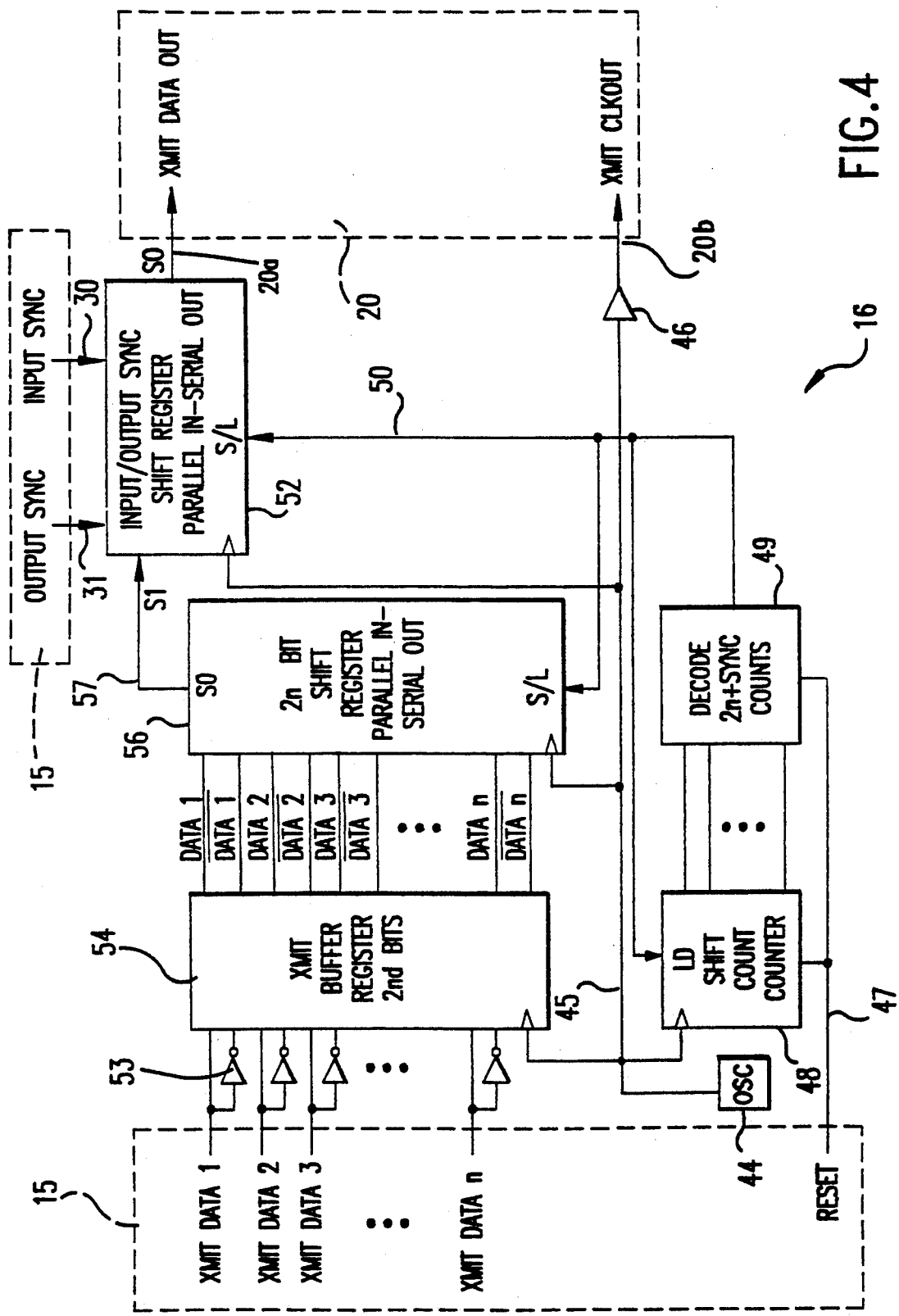
FIG. 4 is a block diagram of the transmitter module located in the programmable controller connected to the network.

Details of the point I/O transmitter 16 are disclosed by the block diagram of FIG. 4. The circuit provides two main functions, the generation of the serial data line 20a and the clock signal 20b. The clock signal 20b which is used to synchronize the devices on the network 20 can be free-running or bursted, but minimum latency is achieved by free-running. Since the operation of the system is independent of the clock frequency, the system clock 45 produced by the oscillator 44 can be optimized for the transmission medium, FCC requirements for EMI and RFI emissions, system noise considerations, and system cycle times. Buffer 46 provides the drive for the network clock signal 20b. A reset signal 47 from the CPU 14 over the data bus 15 starts the transmission of the serial data packet 21 over the serial data line. A shift count counter 48 and a count decoder 49 combine to determine the transmission packet length which is equal to 2n plus the input byte 30 plus the output byte 31 clock periods, where n is the number of remote IORs 12. The decoder 49 produces a shift/load line 50 for the parallel-in serial-out shift registers 52 and 56 and a load signal for the shift count counter 48. Data representing the output state of each IOR 12 is generated by the CPU 14 and sent to a buffer register 54 in a parallel format over the data bus 15. Inverters 53 provide an inversion of each data bit to form the split-phase binary representation that becomes the output byte for each IOR 12. Since the output packet length is dependent on the number of IORs 12 on the network, in those instances where the IOR 12 is not an output, a valid data output must still be sent over the network as a place holder for the IOR 12 to insert its input status in the proper time slot. The output 55 of buffer register 54 goes to a parallel in-serial out shift register 56. Data 57 from this shift register is clocked into the output shift register 52 which combines in order, the input sync pulse 30, the output sync pulse 31 and the output data 57 under control by the shift line 50. The output from this register 52 is the data out signal 20a as illustrated in FIGS. 2(a)-2(b). Since the number of IORs 12 is not fixed and there are limitations as to the width of the data bus 15, the data inputs from the data bus 15 may be split in groups of 8, 16 or 32 depending on the data structure of the data bus 15, the CPU 14 and the shift register 56. This allows virtually an unlimited number of IORs 12 to be connected to the network 20.

Figure 5:
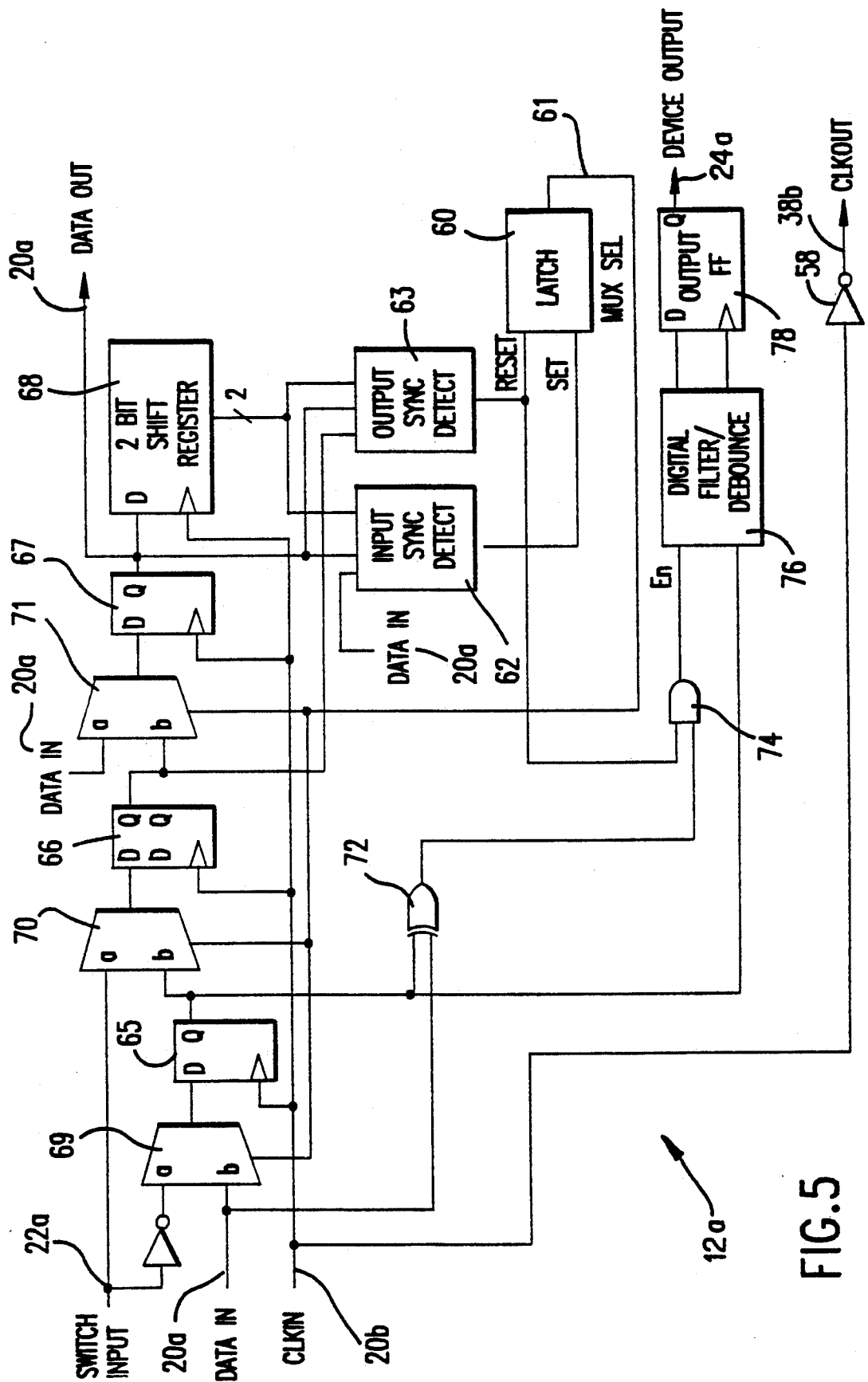
FIG. 5 is a block diagram of the receiver module located in the programmable controller connected to the network.

The IOR(1) 12a is detailed in FIG. 5. The IORs 12 perform a repeater type function and as a result will have an inherent delay with the data received and the data resent over the serial data line 20a. Minimum system delay or latency through the IOR is achieved by keeping the delay to one half of a clock cycle by inverting the clock signal 20b received from the transmitter 16 by inverter 58 so that the output clock signal which goes to IOR(2) 12b is effectively delayed by that amount. The IOR performs several functions. It monitors the switch input 22a. This switch input could be from any type (contacts, limit switches, push buttons, etc.) that could be isolated, but has been converted to the logic voltage levels of the IOR. The status of the input device is inserted into the serial data packet 21 that is sent to the next IOR in the loop. The IOR provides a device output signal 24a that can activate an output driver to pickup a relay, pilot light or similar output device. The IOR does not require a hardwired address, eliminating the need for user setup. Its address is determined by its position on the communication network 20.

The status of the input switch is inserted into the serial data packet 21 after the input sync byte 30. DQ flipflops 65, 66, and 67 form a three stage shift register and are used to clock in the data bits in synchronization with the clock signal 20b and provide the means for adding the input data I(1) to and extracting the output data 0(1) from the serial data packet 21. The two bit shift register 68 provides a memory for use in decoding of the received input data by the input sync detector 62 and output sync detector 63. When detector 62 decodes three consecutive logic ones followed by a logic zero, representative of the input sync byte 30 in the preferred embodiment, it sets latch 60. The output 61 of latch 60 controls the logic switches 69, 70, and 71. These switches allow the DQ FF 67 to output either the serial data packet 21 directly through an input terminal "a" of switch 71 when the latch is reset or, the serial data packet 21 that has been delayed for two cycles throuqh DQ FFs 65 and 66 through an input terminal "b" of switch 71 when the latch is set.

When detector 62 decodes the input sync byte 30 in the preferred embodiment, it sets latch 60. This makes input terminal "b" of switches 69-71 active. At that instant, DQ FF 66 has stored the status of input switch 22a and DQ FF 66 has stored the status of the negation of input switch 22a. These bits will be inserted into the data stream 22a during the next two clock cycles. The data stream 22a will continue to be sent as received at input terminal "b" of switch 69 until the detector 63 decodes three consecutive logic zeros followed by a logic one, representative of the output sync byte 31 in the preferred embodiment. Detector 63 will then reset latch 60. This makes input terminal "a" of switches 69-71 active. At that instant, the bits in DQ FF 65 and DQ FF 66 will be removed from the serial data packet 21 and DQ FF 67 will again output the serial data packet 21 directly through input terminal "a" of switch 71. The information in DQ FFs 65 and 66 contains the status of the output device 24a at that instant in time. Exclusive or 72 verifies that the information is valid and and gate 74 is enabled by the detector 63 to allow the output status to be determined. The digital filter/debounce circuit 76 and the output FF 78 provides protection against contact bounce, erroneous data or noise. The circuit can be set for changing only if there are three consecutive periods of equal requests, for instance. The output of FF 78 could be used to drive a triac or other similar device for activating an output device 24a.

Figure 6:
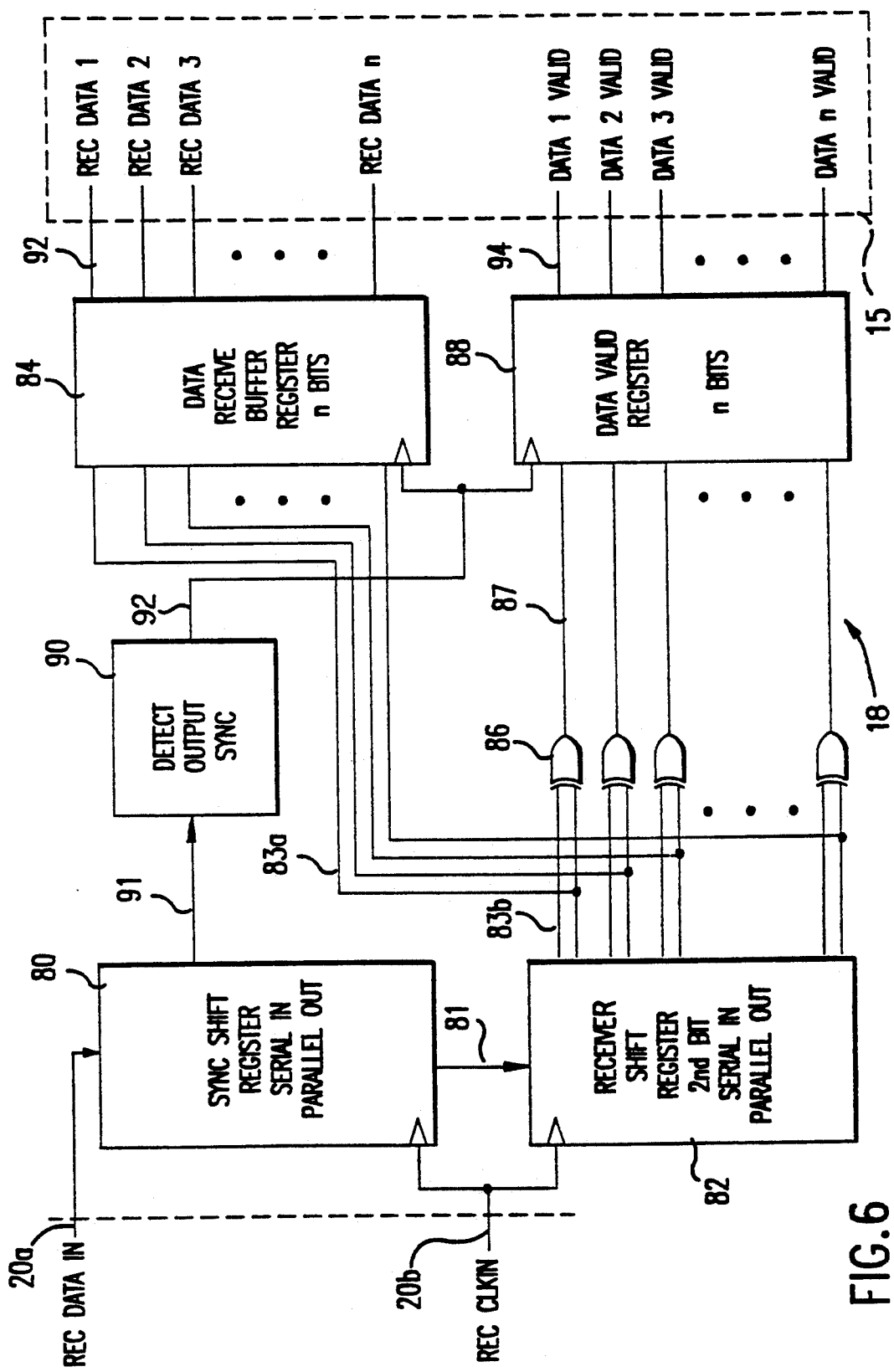
FIG. 6 is a block diagram of an input/output repeater module coupled to the network.

The serial data packet 21 has now been modified by inserting the input switch status bits after the input sync byte 30 and by removing the output switch status bits after the output sync byte 31. The length of the data stream packet has not changed. In those instances where the IOR 12 functions only as an input device, the transmitter 16 still must include a valid output data byte for the IOR as a place holder. Likewise, if the IOR 12 functions only as an output device, it will insert a valid input data byte onto the data stream packet, even though the receiver 18 will ignore it. The output of the IOR will be sent to the next IOR connected in series with it, or in the case of the last IOR on the network, it will be sent to the receiver 18 for decoding of the input data bytes. A block diagram of the receiver is presented in FIG. 6, the details of which follows.

The receiver 18 functions as a shift register and an error detector. The clock input 20b comes from the last IOR 12 on the network 20 and is used to decode the input information that is been inserted into the received serial data packet 21 by the IORs 12 on the network. The serial data packet 21 as received at 40 will be in the form of the 4 bit input sync 30, n input data bytes where n is the number of IORs on the network, and the 4 bit output sync byte 31.

The 4 bit sync shift register 80 will strip the input sync byte 30 from the serial data packet 21 by allowing the serial data packet 21 to be passed through its registers until the output sync byte 31 is detected. The resultant data stream 81 will be coupled to receiver shift register 82 which is a serial to parallel converter. The parallel outputs 83 contain the separated split phase representations of each IOR's input data byte. Thus output 83a will be the first bit of the input data byte, which contains the true status of input device 22a, and output 83b will be the negation of the output 83a. Output 83a, along with the other IORs' first bit of the input data bytes, is transferred to data receive buffer register 84. Outputs 83a and 83b are compared by exclusive "ors" 86. Since these outputs must always be logically opposite, the output 87 must always be a logic one. These outputs are stored in registers 88 which provides a means for detecting errors by position of the IORs in the received serial data packet 21. These errors could have been caused by open or shorted signal lines, noise, or invalid data. Detector 90 monitors the four bit output 91 of sync shift register 80 for the bit pattern of the output sync byte 31. Upon detection of the pattern, it will signal the buffer register 84 and the data register 88 that the period has been completed. Outputs 92 and 94 which contain the status of the input devices 22 connected to the IORs on the network will be sent to the data bus 15 for use by the CPU 14 in the execution of its ladder program.

As is the case with the transmitter 16, the number of input devices 22 is not fixed and there are limitations as to the width of the data bus 15. The data outputs to the data bus 15 may be split in groups of 8, 16 or 32 depending on the data structure of the data bus 15, the CPU 14 and the registers 84 and 88. This allows virtually an unlimited number of IORs 12 to be connected to the network 20.

For minimum latency through the system, the serial data packets 21 are cyclically free-running with the serial data line 20a always active with no transmission dead time or off time. There are no requirements for start or stop bits, parity bits, checksum bits, or other error checking codes.

While the specific embodiments have been illustrated and described, numerous modifications are possible without departing from the scope or spirit of the invention. The IORs can be miniaturized using ASIC packages for direct integration of the IOR with specific input and output devices, for example.

We claim:

1. A transmitter module for transferring data between a microprocessor based device and a network of I/O repeater modules over a synchronous serial communications network, said transmitter module comprising:
   (A) a buffer register coupled to a data bus in said microprocessor based device, said buffer register for storing data bits generated by said microprocessor based device;
   (B) an oscillator for generating a clock pulse and a clock rate for said synchronous serial communications network;
   (C) counter/decoder means for generating a shift/load line based on said clock rate and a data packet length based on the total number of said repeater modules connected to said synchronous serial communications network;
   (D) a first shift register coupled to said buffer register, said first shift register for storing said data bits coupled from said buffer register and for converting said data bits into a first serial data packet, said conversion at a rate controlled by said shift/load line;
   (E) a second shift register for receiving said first serial data from said first shift register, said second shift register for inserting an input sync byte and an output sync byte in series with said first serial data packet to produce a second serial data packet synchronized with said shift/load line; and
   (F) wherein said second serial data packet is coupled to said synchronous serial communications network for transmission to said I/O repeater modules.

2. The transmitter module of claim 1 wherein said data bits generated by said microprocessor based device represent status bits for output devices that may be connected to said I/O repeater modules.

3. The transmitter module of claim 2 wherein said data bits are converted to split-phase binary output bytes by said first shift register, one of said output bytes for each of said I/O repeater modules and included in said first serial data packet.

4. The transmitter module of claim 3 wherein said second data packet consists of an input sync byte, an output sync byte, and n number of output bytes, where n is the number of said I/O repeater modules connected on said network.

5. The transmitter module of claim 3 wherein each of said I/O repeater modules connected on said network extracts its respective said output byte from said second data packet for controlling said respective output device.

6. The transmitter module of claim 1 wherein said device is a programmable logic controller.

7. The transmitter module of claim 1 wherein said device is a personal computer.

8. The transmitter module of claim 1 wherein said synchronous serial communications network is a multi-conductor wire cable and said second serial data packet is transmitted over said cable.

9. The transmitter module of claim 1 wherein said synchronous serial communications network is a fiber optic cable and said second serial data packet is transmitted over said cable.

* * * * *